T. L. & T. J. STURTEVANT.
CRUSHING ROLL.
APPLICATION FILED APR. 30, 1907.
907,300.
Patented Dec. 22, 1908.
2 SHEETS—SHEET 2.
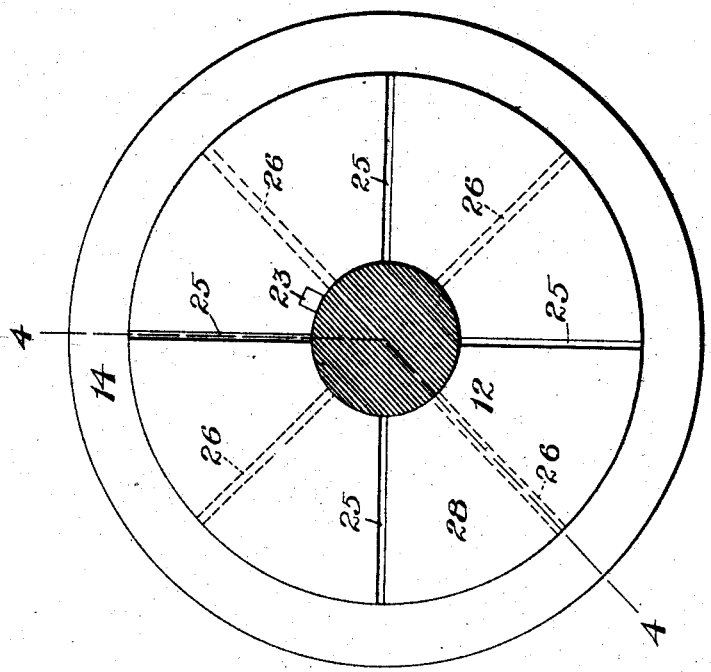
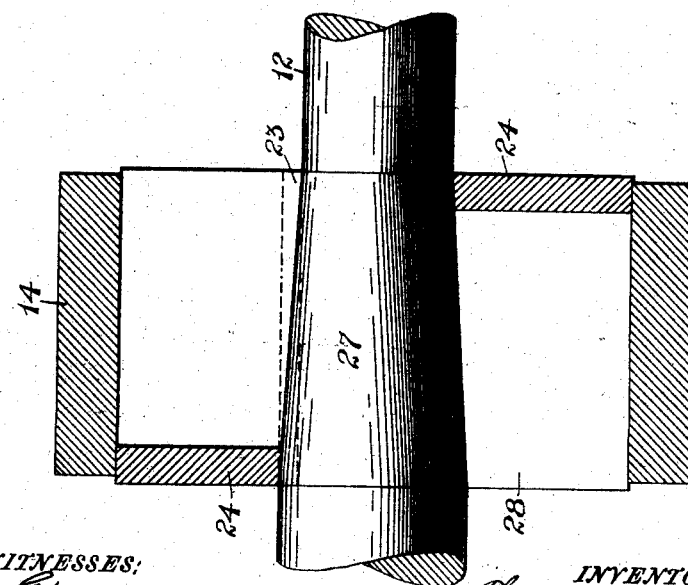

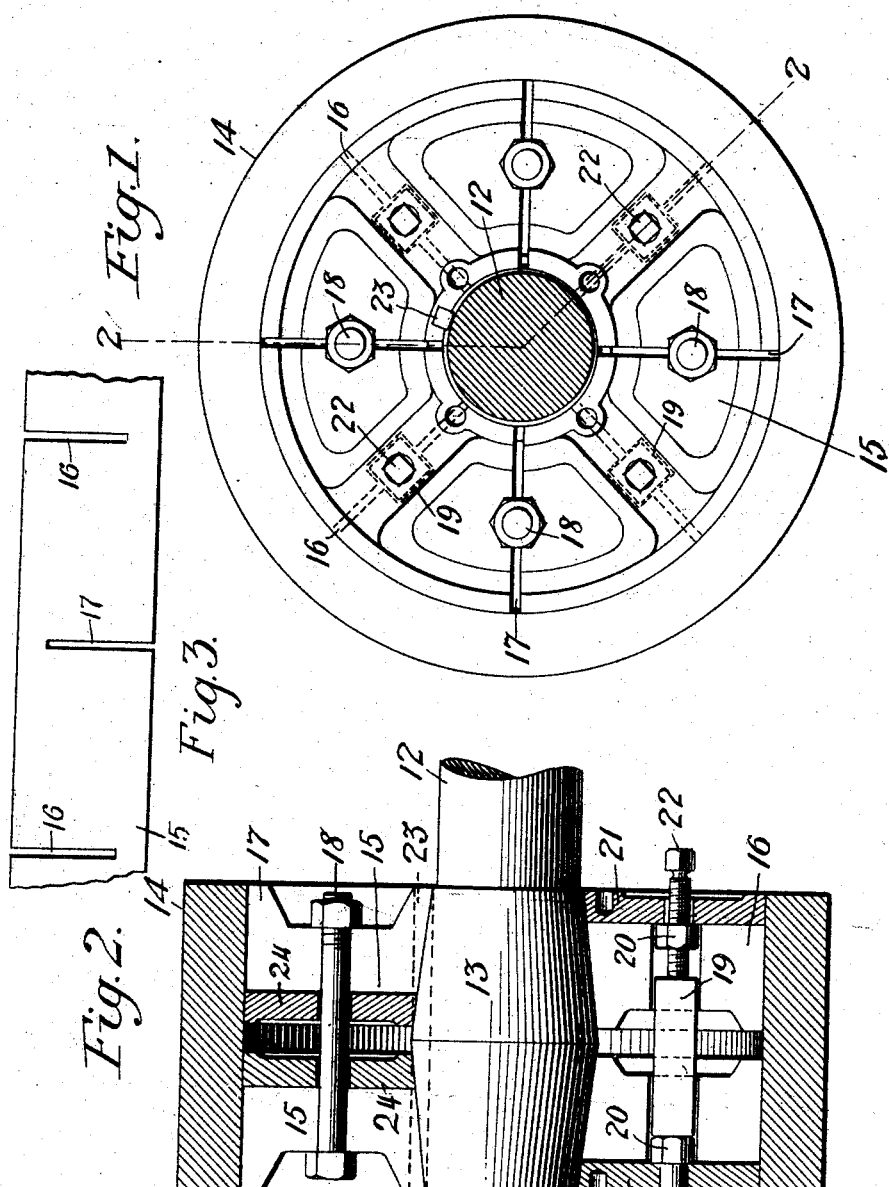

UNITED STATES PATENT OFFICE.

THOMAS LEGGETT STURTEVANT, OF QUINCY, AND THOMAS JOSEPH STURTEVANT, OF WELLESLEY, MASSACHUSETTS, ASSIGNORS TO STURTEVANT MILL COMPANY, OF PORTLAND, MAINE, A CORPORATION OF MAINE.

CRUSHING-ROLL.

No. 907,300.  Specification of Letters Patent.  Patented Dec. 22, 1908.

Application filed April 30, 1907. Serial No. 371,177.

*To all whom it may concern:*

Be it known that we, THOMAS LEGGETT STURTEVANT and THOMAS JOSEPH STURTEVANT, citizens of the United States, residing, respectively, at Quincy and Wellesley, in the county of Norfolk and State of Massachusetts, have invented or discovered certain new and useful Improvements in Crushing-Rolls, of which the following is a specification, reference being had therein to the accompanying drawings.

This invention relates to roll crushing machines for reducing ores and other similar hard materials, and in which the crushing rolls comprise tires formed separate from the hearts of the bodies of the rolls; and the invention has for its object to provide rolls, of an improved construction, in which the tires of the rolls will be strongly held in place and connected with the shafts of the rolls in such a manner that they may be readily dismounted or removed when necessary. To this end the shafts of the rolls are provided with portions which are preferably doubly tapered in opposite directions, and between the shafts and the tires of the rolls are interposed expansible rings or roll hearts the inner surfaces of which are tapered to fit the tapered portions of the shafts and the outer surfaces of which are turned to fit the inner surfaces of the tires; the said rings or roll hearts being intersected by a series of radial and longitudinal slots preferably extending alternately from opposite end faces of the said rings or roll hearts so that the latter, when forced by clamping bolts onto the tapered or inclined portions of the shafts will expand and strongly grip the tires and shaft, and thus connect them together; said rings or roll hearts being preferably keyed or splined to said shafts so as to rotate therewith.

In the accompanying drawings Figure 1 is a side view of one of the improved crushing rolls mounted on a shaft, and Fig. 2 is a transverse section thereof on line 2—2, Fig. 1. Fig. 3 is a partial surface development or projection of one of the expansible rings. Fig. 4 shows, in section on line 4—4, Fig. 5, a form of the invention comprising only a single expansible ring, and Fig. 5 is an end view of the same as viewed from the left of Fig. 4.

Referring to the drawings, 12 denotes the roll-shaft which is preferably of forged steel, and which, in the preferred form of the invention, is provided with an integral doubly tapered portion 13 the central or highest portion of which is preferably in the center of the roll. Interposed between the tire 14 of the roll and the doubly tapered portion 13 of the roll shaft 12 are rings or roll hearts 15 the inner faces of which are tapered to fit the tapered portions of the shaft and the outer faces of which are turned to fit the interior face of the tire. As the inner face of the tire 14 is plain, or parallel to the axis of the shaft, of course the outer faces of the expansible and contractible metallic rings 15 are likewise plain or parallel to the said shaft, so as to fit the said inner parallel face of said tire.

Each of the rings or roll hearts 15 is provided with longitudinal and radial slots 16 and 17 extending alternately from the opposite sides or end faces of the rings, (see Fig. 3) and nearly cutting the rings into sections; these slots, it will be understood, rendering the rings or roll hearts expansible as they are forced onto the tapered portions of the roll-shaft by screwing up the nuts on the holding bolts 18 so as to draw the said rings or roll hearts toward each other on the doubly tapered or doubly conical portion of the roll-shaft. The slots 16 and 17 so intersect the rings or roll hearts 15 that they are connected, at the points of intersection by said slots, only by the outer webs 21 and inner webs 24. The said rings or roll hearts 15 are recessed at points intersected by the slots 16 for the reception of push-blocks 19 and abutment nuts 20 inside the outer webs 21, a part or all of said nuts receiving screws 22 which may be turned to force the said rings or roll hearts away from each other when the nuts on the bolts 18 have been loosened, and when it may be desired to disconnect or remove the tires from the shafts; the said rings or roll hearts contracting as they are forced apart on the doubly tapered portion of the shaft so as to release their grip against the inner face of the tire. The said rings or roll hearts 15 are preferably connected with the shaft 12 by means of a spline 23 so that they will be positively secured to the shaft, to rotate therewith; and thus when they are expanded within the tire 14 they will strongly grip the shaft and the tire and thereby firmly connect the said shaft and tire together.

In the form of the invention shown in Figs. 4 and 5 the tire 14 is connected with the shaft 12 by a single expansible and contractible ring or roll heart 28 having alternating longitudinal and radial slots 25, 26, extending from opposite end faces of said ring like the slots 16, 17, and dividing the said ring into sections connected by end webs 24, said ring being tapered on its inner face and fitting a single tapered portion 27 of the said shaft 12. In this simple form of the invention the expansible and contractible ring is driven on to the tapered portion of the shaft within the tire by blows of a hammer, mallet or other implement, to secure the tire to the shaft; and the tire can be loosened simply by driving the expansible and contractible ring in the opposite direction, as will be understood.

From the foregoing it will be seen that the improved construction provides means whereby the tire may be readily removed, without removing the roll hearts or holding rings from the shaft, and that both the tire and the shaft are gripped by the expansible rings or roll hearts in such a manner that the one cannot work loose from the other, nor can the roll hearts or rings work sidewise on the shaft. The construction is therefore a rigid and strong one in which the tires are firmly braced internally by the roll hearts so as to present the resistance required in crushing very hard materials.

We are aware that crushing rolls have heretofore been made having tires tapered on their inner surfaces to assist in connecting the tires with the roll shafts, but the tires with tapered inner surfaces have been found difficult and expensive to make. The improved construction is preferable to the construction in which the inner face of the tire is plain, or parallel to the axis of the shaft just referred to in that it not only permits the tires to be removed without removing the roll hearts from the shafts, but in that the expense of making is less.

Having thus described our invention we claim and desire to secure by Letters Patent:

1. The combination with a roll shaft, having a doubly tapered portion, of two metallic rings or roll hearts provided with slots extending alternately from their opposite end faces to render them expansible and contractible, a tire encircling said rings or roll hearts and having an inner face which is parallel to said shaft, means for drawing said rings or roll hearts together, and means for forcing them apart.

2. The combination with a shaft provided with a double tapered portion with its highest part at its center, of a roll tire, two expansible and contractible rings or roll hearts interposed between and in direct contact with said doubly tapered portion and said tire, and means for forcing said rings apart when it is desired to disconnect or loosen the said tire from said shaft.

In testimony whereof we affix our signatures, in presence of two witnesses.

THOMAS LEGGETT STURTEVANT.
THOMAS JOSEPH STURTEVANT.

Witnesses:
W. H. ELLIS,
GRACE G. GODFREY.